US005886267A

United States Patent [19]
Ortiz

[11] Patent Number: 5,886,267
[45] Date of Patent: Mar. 23, 1999

[54] SYSTEM AND METHOD FOR BIDIRECTIONAL FLOW AND CONTROLLING FLUID FLOW IN A CONDUIT

[75] Inventor: Marcos German Ortiz, Idaho Falls, Id.

[73] Assignee: Lockheed Martin Idaho Technologies Company, Idaho Falls, Id.

[21] Appl. No.: 771,316

[22] Filed: Oct. 3, 1996

Related U.S. Application Data

[63] Continuation-in-part of PCT/US96/01521, Feb. 2, 1996 which is a continuation-in-part of Ser. No. 383,343, Feb. 3, 1995, Pat. No. 5,641,915.

[51] Int. Cl.[6] .............................. G01N 1/12; G01N 1/10
[52] U.S. Cl. ................................. 73/861.61; 73/861.72
[58] Field of Search ........................ 73/30.01, 30.02, 73/32, 438, 861.42, 861.52, 861.58, 861.61, 861.63, 861.69, 861.72

[56] References Cited

U.S. PATENT DOCUMENTS

| | | |
|---|---|---|
| 970,965 | 9/1910 | Speed . |
| 1,181,490 | 5/1916 | Levin . |
| 1,559,155 | 10/1925 | Bullock ................................. 73/861.61 |
| 1,698,314 | 1/1929 | Mapelsden ........................... 73/861.61 |
| 1,905,558 | 4/1933 | Foote . |
| 1,963,011 | 6/1934 | Albersheim et al. . |
| 2,023,568 | 12/1935 | Albersheim et al. ................ 73/861.63 |
| 3,067,611 | 12/1962 | Bowers et al. . |
| 3,777,549 | 12/1973 | Lodge . |
| 4,074,573 | 2/1978 | Nordhofen . |
| 4,144,754 | 3/1979 | Pitts, Jr. et al. ................ 73/861.69 X |
| 4,237,739 | 12/1980 | Owen et al. ......................... 73/861.63 |
| 4,277,832 | 7/1981 | Wong . |
| 4,300,399 | 11/1981 | Kuijpers et al. ..................... 73/861.04 |
| 4,470,311 | 9/1984 | Southwell ........................... 73/861.69 |
| 4,562,744 | 1/1986 | Hall et al. ....................... 73/861.61 X |
| 4,581,934 | 4/1986 | Holzl ............................... 73/861.61 X |
| 4,625,548 | 12/1986 | Charter ................................. 73/438 X |
| 4,625,553 | 12/1986 | Charter .................................... 73/438 |
| 4,856,344 | 8/1989 | Hunt . |
| 4,896,542 | 1/1990 | Hunter ................................. 73/861.63 |
| 5,199,306 | 4/1993 | Hunter ................................. 73/861.63 |
| 5,323,661 | 6/1994 | Cheng ............................. 73/861.42 X |
| 5,337,603 | 8/1994 | McFarland . |
| 5,400,657 | 3/1995 | Kopak et al. . |
| 5,641,915 | 6/1997 | Ortiz et al. ......................... 73/861.69 |
| 5,693,891 | 12/1997 | Brown et al. ................... 73/861.63 X |

FOREIGN PATENT DOCUMENTS

| | | |
|---|---|---|
| 2565344 | 12/1985 | France . |
| 2828-129 | 3/1980 | Germany ........................... 73/861.69 |
| 2-38817 | 2/1990 | Japan . |
| 712-669 | 1/1980 | U.S.S.R. ............................. 73/861.69 |
| 432416 | 7/1935 | United Kingdom . |

OTHER PUBLICATIONS

McGraw–Hill, McGraw–Hill Encyclopedia of Science & Technology, 6th Edition, Published 1987, by McGraw–Hill Book Co. (NY), p. 162, See "Pipe Elbow"& FIG. 7.
E.G. Hauptmann, "Take a Second Look at Elbow Meters for Flow Monitoring", Instruments and Control Systems, Oct. 1978, pp. 47–50, See Entire Document.
SU A, 765,696 (Tyurikov et al.) 30 Sep. 1992, See Abstract and the FIG.
Jp, A, 64–732221 (Onishi) 17 Mar. 1989, See The Abstract and FIG. 1

*Primary Examiner*—Ronald Biegel
*Assistant Examiner*—Paul D. Amrozowicz
*Attorney, Agent, or Firm*—Thorpe North & Western

[57] ABSTRACT

A system for measuring bidirectional flow, including backflow, of fluid in a conduit. The system utilizes a structural mechanism to create a pressure differential in the conduit. Pressure sensors are positioned upstream from the mechanism, at the mechanism, and downstream from the mechanism. Data from the pressure sensors are transmitted to a microprocessor or computer, and pressure differential detected between the pressure sensors is then used to calculate the backflow. Control signals may then be generated by the microprocessor or computer to shut off valves located in the conduit, upon the occurrence of backflow, or to control flow, total material dispersed, etc. in the conduit.

20 Claims, 2 Drawing Sheets

(Top View)

SYSTEM AND METHOD FOR BIDIRECTIONAL FLOW AND CONTROLLING FLUID FLOW IN A CONDUIT

This is a continuation-in-part of PCT/US96/01521 filed Feb. 2, 1996, which is a continuation-in-part of application Ser. No. 08/383,343, filed Feb. 3, 1995, now U.S. Pat. No. 5,641,915.

CONTRACTUAL ORIGIN OF THE INVENTION

The United States Government has rights in this invention pursuant to Contract No. DE-AC07-94ID13223 between Lockheed Martin Idaho Technologies Company and The United States Department of Energy.

BACKGROUND

1. Field of the Invention

This invention relates to apparatus and methods for measuring forward flow and backflow in a conduit, such as the backflow (or forward flow) of water in an irrigation pipe, and controlling or shutting down the flow on the occurrence of significant backflow (or forward flow).

2. Background Art

Systems for measuring flow through a conduit have a long history and so a number of general types of systems for measuring flow have, thus, naturally developed. The size of the conduit being used, accuracy, cost, and other factors all play a role in determining what specific device will be used for a given application.

One type of flow measurement system is the pressure differential system which works on the principle that when the flow in a conduit is in some way restricted, kinetic energy increases at the expense of available potential energy. The pressure differential system utilizes some method of restricting the flow in the conduit and the resulting pressure difference is measured and the flow rate calculated, using a known equation, fixed parameters of the system, and the pressure differential measured.

The desire to measure flow through a conduit arises in a number of different ways. The need to control the amount of fluid/material delivered, the time over which the fluid/material is delivered, the need to stop delivery on the happening of a predetermined condition or conditions, and the desire to measure and track the amount of fluid/material delivered are among these.

In regard to the desire to stop or control delivery on the happening of a predetermined condition or conditions, it is often the case that certain conditions will indicate a malfunction in the system. If a malfunction has occurred or is occurring, shutting down the system may be required to avoid damage throughout the system.

One such condition is the occurrence of backflow. For example, in is an agricultural irrigation system, the presence of backflow may indicate inadequate pressure or water source, and this may result in damage to the flow measurement equipment or other equipment associated with the system. Pumps are often particularly susceptible to damage if operated "dry".

In agricultural irrigations systems, the irrigation water source may suddenly be cut off for any number of reasons, or the flow may be substantially reduced. In such a case, although the irrigation pump would continue to operate, little or no additional water would enter the system. The resulting lack of pressure in the system could result in backflow. If backflow were detected, the system could be shut down. This would reduce the likelihood of damage to the pump supplying the system, the flow measurement apparatus, or other associated equipment, and reduce the possibility of well contamination from fertilizers, insecticides, etc.

The typical system, unfortunately, is designed to measure flow through the conduit in one direction only, usually the direction of intended flow. In such a system, no apparatus for measuring backflow is available and thus any data relating to backflow is ignored. (In fact, very slow flow oftentimes cannot be measured.) Other systems may measure flow generally, without regard to direction. In these systems backflow may be being measured but there is no way for a user or control system to discern this and the system takes no action based on backflow. Since no provisions for measuring or reacting to backflow are incorporated in such systems, damage or disablement of the system may result if sufficient backflow occurs. Additionally, the cause of the backflow may itself damage the system.

It would therefore be an advantage to provide a system for measuring fluid flow (including both single-phase and multi-phase) in a conduit which is also adapted for measuring backflow and, if desired, taking action based on the occurrence of backflow.

BRIEF SUMMARY AND OBJECTS OF THE INVENTION

The present invention is an apparatus for measuring bidirectional flow, and thus backflow in a conduit. The measurement apparatus comprises a means for restricting, contracting or otherwise modifying the flow of material in the conduit such that a pressure differential is created, sensors for measuring the pressure differential created by the modification, and a computer for calculating the forward flow or backflow (magnitude and direction) through the conduit from data collected from the sensor means.

In one preferred embodiment, the modification is restriction which comprises a rounded protrusion. The sensors comprise a pressure transducer placed upstream of the rounded protrusion, a pressure transducer placed substantially at the point of greatest extension into the conduit of the rounded protrusion, and a pressure transducer placed downstream from the rounded protrusion. The system may be calibrated to take into account slight variations in the configuration.

Also in a preferred embodiment, the computer is a microprocessor or other calculation device, programmed or configured to calculate flow magnitude and direction based on the data received from the sensors.

The computer may also be used to produce control signals for controlling the system. For example, signals may be generated and transmitted to shut down the system in the event of substantial backflow. Control signals may also be generated to control the amount of material delivered, the rate of delivery, or the destination of delivery based on the calculation of flow.

Other modifications for producing pressure differential in the flow could include providing a bend in the conduit, either an abrupt bend or a smooth, gradual bend.

For multi-phase fluid flow through a conduit (flow of two or more materials of differing density), an average density measurement is taken by measuring the vertical pressure differential of the fluid between two pressure transducers disposed in the conduit, with one transducer at a higher elevation than the other but generally in the same vertical slice of the conduit, positioned either before or after the rounded protrusion or the bend. This pressure differential measurement may then be used to calculate fluid density which, in turn, is used to calculate multi-phase fluid flow rate.

Accordingly, it is a primary object of the present invention to provide a system for detecting and measuring backflow of fluid material in a conduit.

It is another object of the invention to provide a system which is capable of measuring both forward flow and backflow of single-phase and/or multi-phase fluid in a conduit.

It is a further object of the invention to provide a system for measuring backflow with little intrusion into the conduit.

A still further object of the invention is to provide a system which is substantially resistant to problems of blockage or plugging of the conduit.

Still another object of the invention is to provide a system for measuring backflow which reduces the impact and cost often associated with installation of a flow measurement system.

It is also an object of the invention to provide a mechanism for controlling or shutting down the system in the event of flow in an unintended direction.

These and other objects of the present invention will become more fully apparent from the following detailed description and appended claims.

BRIEF DESCRIPTION OF THE DRAWINGS

In order to more fully understand the manner in which the above-recited and other advantages and objects of the present invention are obtained, a more particular description of the invention briefly described above will be rendered by reference to the presently understood best mode for making and using the same, as illustrated in the appended drawings. Understanding that these drawings depict only typical embodiments of the invention and are, therefore, not to be considered as limiting of its scope, the invention will be described with additional specificity and detail through the use of the accompanying drawings in which.

DETAILED DESCRIPTION OF THE INVENTION

Figure 1:
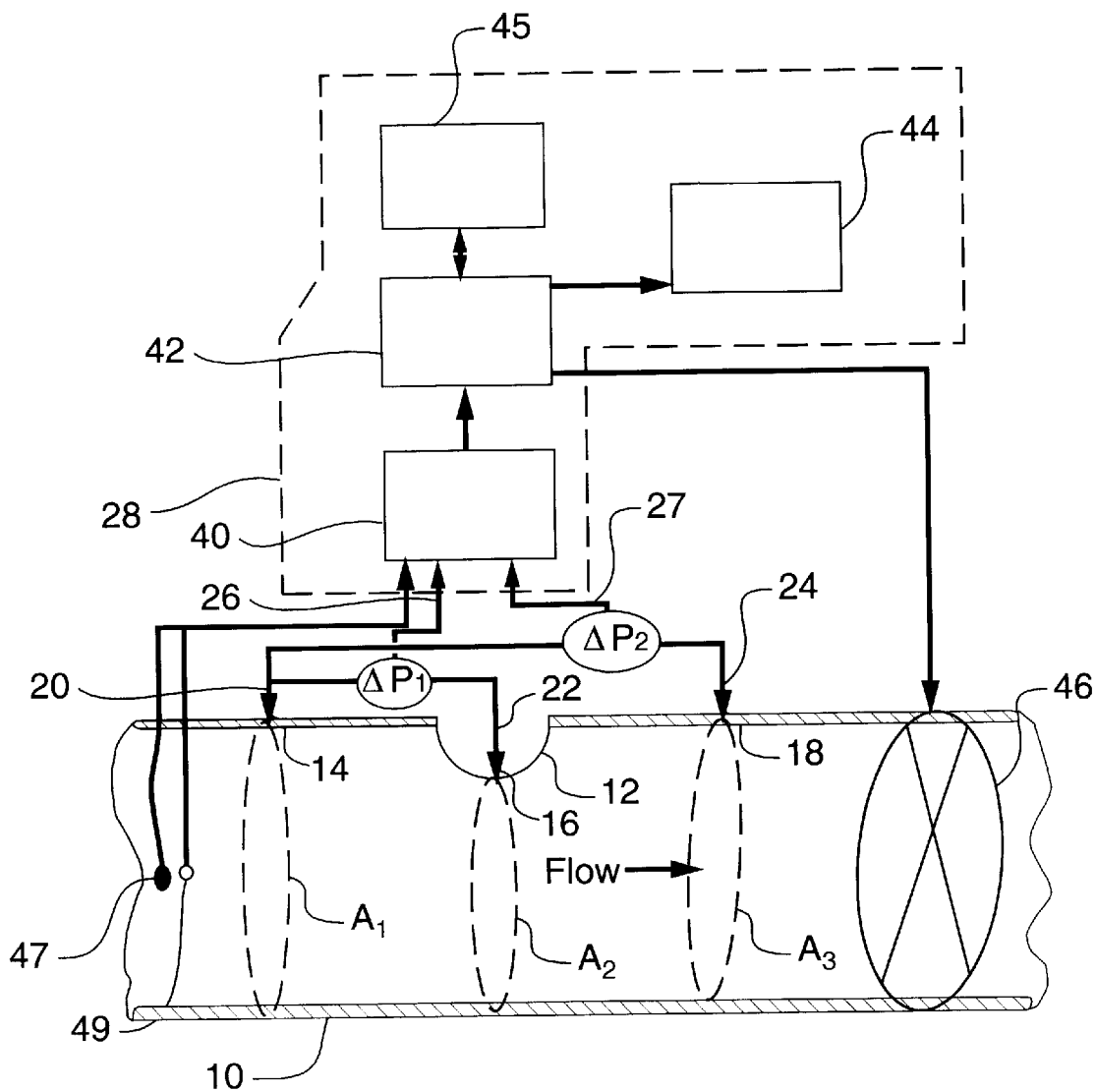
FIG. 1 is a top, fragmented, cross-sectional view of one embodiment of the present invention, illustrating a rounded protrusion apparatus for creating a pressure differential.

Reference is now made to the embodiment illustrated in FIG. 1 as it might appear in use. The normal direction of flow of fluid/material is shown by the arrows.

As depicted, the system for measuring bidirectional flow in a conduit 10 includes a rounded protrusion 12, either spherical or cylindrical. Using a rounded protrusion has a number of advantages.

First, a rounded protrusion, such as those depicted, is less susceptible to causing an obstruction in the conduit than protrusions using sharp edges or points. For example, in agricultural irrigation systems, there is often debris carried along with the water in the conduit. Rounding the protrusion eliminates sharp edges which may have a tendency to catch and hold the debris.

Second, rounding the protrusion allows for more predictable and a accurate flow readings. Abrupt or sharp edged protrusions can result in highly unpredictable effects on the fluid flow. This, in turn, hinders obtaining predictable and accurate results in measuring fluid flow. Rounding the protrusion results in a less abrupt and less turbulent flow, thus providing more analytically predictable results.

Yet another advantage of a rounded protrusion over a more abrupt protrusion is the reduction in associated power loss. Although any protrusion will result in some power loss, rounding the protrusion will typically result in less power loss in comparison to more abrupt protrusion.

A series of sensors 14, 16 and 18 are disposed in the vicinity of the rounded protrusion 12. The sensors are designed to detect pressure and might illustratively be piezoelectric pressure sensors. Upstream pressure sensor 14 is located upstream, in terms of the normal direction of flow, from the rounded protrusion 12. Protrusion pressure sensor 16 is disposed on protrusion 12. Downstream pressure sensor 18 is positioned downstream, again in terms of the normal direction of flow, from the rounded protrusion 12.

Associated with upstream pressure sensor 14 is communications line 20, associated with protrusion pressure sensor 16 is communications line 22, and associated with downstream pressure sensor 18 is communications line 24. Each of these communications lines is attached to a respective data communications bus 26 or 27. Data is conveyed from upstream pressure sensor 14, protrusion pressure sensor 16 and downstream pressure sensor 18 via respective communications lines and the communications buses 26 or 27 to a control unit 28.

Placement of upstream pressure sensors 14, protrusion pressure sensor 16, and downstream pressure sensor 18 can vary somewhat while maintaining relatively accurate results. Protrusion pressure sensor 16, however, is preferable placed substantially at the point where protrusion 12 extends to the greatest degree into conduit 10. Dotted lines $A_1$, $A_2$, and $A_3$ represent the cross-sectional areas ofs the conduit 10 at the locations of the sensors 14, 16 and 18, respectively.

Although pressure transducers are illustrated in the drawing, and these transducers would detect fluid pressure at the location of their installation and develop a signal for transmission to a control unit 28, or other calculation device, it should be understood that fluid pressure taps could be used in place of the transducers for communicating fluid from the conduit 10 to a common pressure measuring device. Thus, when referring to a pressure transducer or pressure sensor, this should be understood to include a pressure tap.

Signals coming from upstream pressure sensor 14, protrusion pressure sensor 16, and downstream pressure sensor 18 will typically be analog signals supplied to an analog-to-digital ("A/D") convertor 40 so as to be converted to digital signals for conveyance to computer 42. The computer 42 might illustratively be a IBM PC or a clone thereof, with associated memory, power supply, etc.

To calculate backflow, the computer 42 receives data from upstream pressure sensor 14, protrusion pressure sensor 16, and downstream pressure sensor 18, and solves the following equation:

$$m_f = A_1 \sqrt{\frac{2(\Delta P_2 + \Delta P_1)\rho}{\left[\left(\frac{A_1}{A_2}\right)^2 - 1\right]}} \quad (1)$$

where:

$m_f$=mass flow in kilograms per second;

$A_1$=the cross-sectional area of the conduit at pressure sensor 14, in square meters;

$A_2$=the cross-sectional area of the conduit at pressure sensor 16, in square meters;

$\rho$=the fluid density of the fluid flowing in the conduit in kilograms per cubic mater.

$\Delta P_1$=the pressure differential detected between upstream pressure sensor 14 and protrusion pressure sensor 16; and $\Delta P_2$=the pressure differential detected between downstream pressure sensor 18 and upstream pressure sensor 14.

If it is desired to calculate forward flow (normal direction), computer 42 can accomplish this by receiving data from upstream pressure sensor 14 and protrusion pressure sensor 16 and solving the following equation:

$$m_f = A_1 \sqrt{\frac{2\Delta P_1\rho}{\left[\left(\frac{A_1}{A_2}\right)^2 - 1\right]}} \quad (2)$$

where:

$m_f$=mass flow in kilograms per second;

$\Delta P_1$, $A_1$, $A_2$ and $\rho$:=defined as before.

Of course, the two equations above can be solved essentially simultaneously by the computer 42 and if $\Delta P_1$ is positive, forward flow is indicated and equation (2) would be used, whereas if $\Delta P_2$ is positive, backflow is indicated and equation (1) would be used.

Once backflow is calculated by computer 42, signals are provided to a display 44 to produce a visual and/or audible output indicating the backflow rate. Computer 42 may also generate control signals to control operation of a valve 46 disposed in the conduit 10 to block delivery of material through the conduit on occurrence of backflow, for example.

Although the discussion above related to measurement of flow of a single phase fluid, such as water in an agricultural irrigation system, it is contemplated that the present invention will have application in other areas. For example, the invention lends itself to the measurement of mixtures and fluids containing impurities such as the flow of a slurry, for example a coal slurry, through a pipe, or multi-phase mixtures such as oil, water, gas and sand. Other examples would include measurement of the flow of municipal waste water and measurement of two-phase flow in a power plant. Clearly, there are a variety of applications of multi-phase fluid flow with which the present invention might be utilized.

If the fluid flowing in the conduit 10 is a multi-phase fluid, then the fluid density would not be known at any given time or any given location in the conduit. In this case, it would be necessary to calculate the density for inclusion in the computation by the computer 42, as indicated in the above formulas. Pressure transducers 47 and 49, with pressure transducer 47 being disposed elevationally above pressure transducer 49 in the conduit 10, may be used to calculate fluid density. The formula for doing this:

$$\rho = \frac{\Delta P}{gH}$$

where:

g=the gravitational constant;

H=elevational distance in meters of the pressure transducer 47 above the pressure transducer 49; and $\Delta P$=pressure difference between pressure transducers 47 and 49.

The pressure transducers for use in calculating fluid density may be located either upstream or downstream of the protrusion 12 but there needs to be maintained an elevational difference between the two transducers to make the calculation. It is not necessary that the uppermost transducer be directly above the lowermost, but only that it be at an elevation above that of the lowermost transducer.

Figure 2:
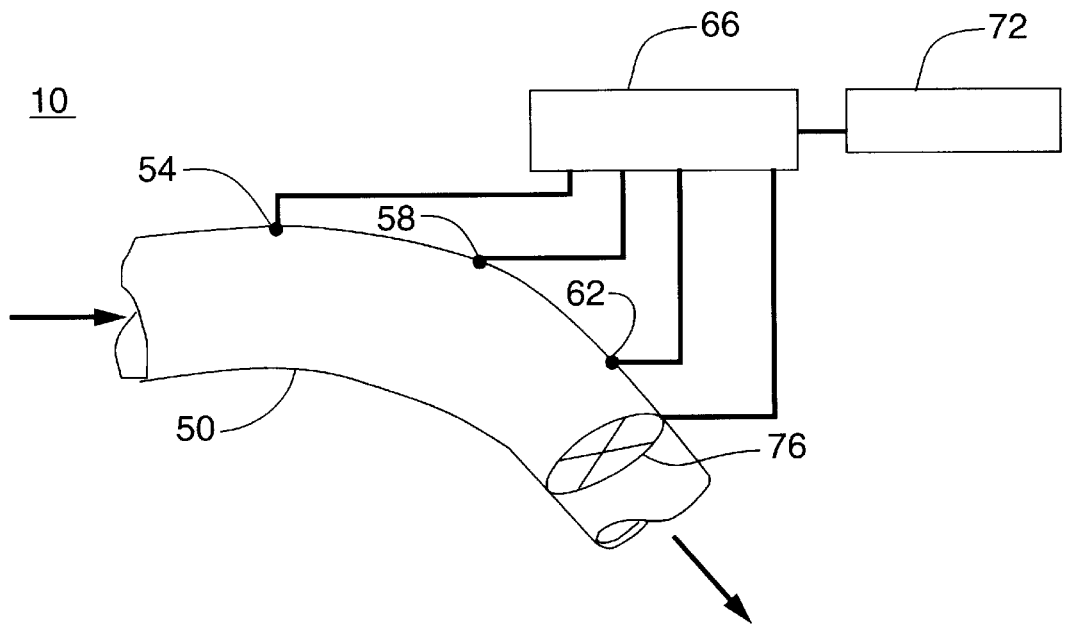
FIG. 2 is a side, fragmented, cross-sectional view of another embodiment of the present invention, illustrating a gradual bend for creating a pressure differential.

FIG. 2 shows an alternative embodiment of a conduit 10 having a gradual bend 50 for producing a pressure differential in the fluid carried in the conduit. As with the embodiment of FIG. 1, three pressure transducers 54, 58 and 62 are disposed generally in a line in the conduit 10 before the bend, at the bend and after the bend respectively. That is, pressure transducer 54 is disposed upstream of the bend, pressure transducer 58 is disposed at the bend (generally in the middle in FIG. 2), and pressure transducer 62 is disposed downstream of the bend. With three pressure readings made by the pressure transducers, a computer 66 can calculate both forward flow rate and back flow rate, for display on a visual/audible display unit 72.

As with the embodiment of FIG. 1, if it is desired that flow in the conduit 10 be stopped for certain conditions determined by the computer 66, the computer can cause closing of a valve 76 to thus stop the flow.

Figure 3:
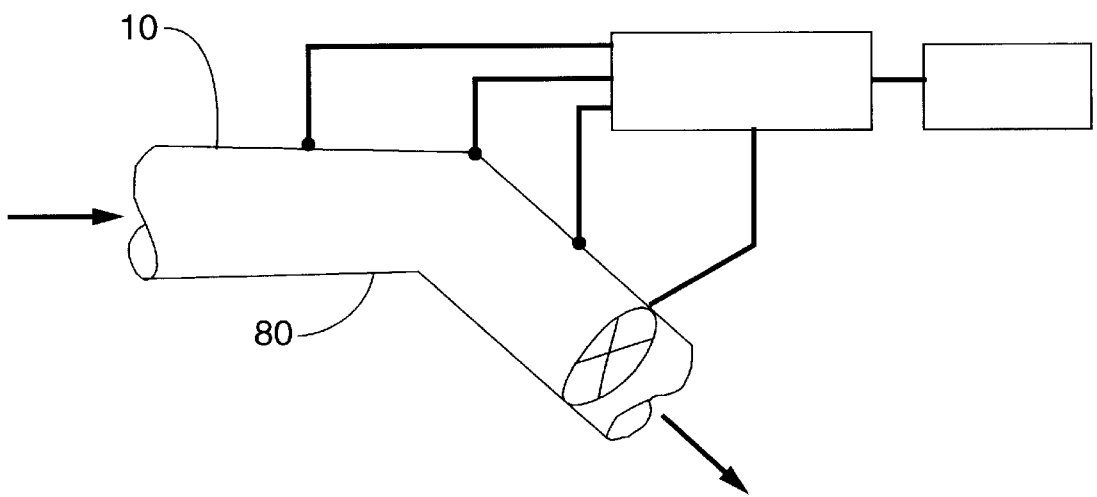
FIG. 3 is a side, fragmented, cross-sectional view of still another embodiment of the present invention, illustrating an abrupt bend for creating a pressure differential.

FIG. 3 shows another embodiment of the present invention in which the pressure differential causing mechanism in the conduit 10 is an abrupt bend 80 formed in the conduit. The other components of the system are the same as previously described.

In the manner described above, a bidirectional flow measuring system is provided for measuring single phase or multi-phase fluid flow in a conduit. By provision of the capability of measuring backflow, as well as forward flow, undesired resulting backflow can be detected and actions taken to either prevent or minimize the damage which might otherwise be caused. Although action was shown as being automatically carried out upon the detection of backflow, it should be understood that a simple alarm might be sounded to allow a user to initiate whatever manual adjustments the user may desire to correct the situation.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

I claim:

1. A system for measuring bidirectional flow of fluid in a conduit comprising:

means incorporated in a conduit for creating a pressure differential in the fluid flowing in the conduit;

a plurality of sensor means disposed partially within the conduit and positioned about the pressure differential creating means for measuring the pressure differential created by said pressure differential creating means and for producing signals indicative of the measurements, wherein at least one sensor means is disposed upstream of normal flow direction of the pressure differential creating means, at least one sensor means is disposed at the pressure differential creating means, and at least one sensor means is disposed downstream of the pressure differential creating means; and a control means for receiving signals from the sensor means and for computing flow direction and magnitude from the signals, including backflow magnitude from the pressure differential between the at least one sensor means disposed upstream and the at least one sensor means disposed at the pressure differential creating means, and the pressure differential between the at least one sensor disposed upstream and the at least one sensor means disposed downstream.

2. A system as defined in claim 1 wherein the pressure differential creating means comprises at least a partially rounded protrusion.

3. A system as defined in claim 1 wherein the pressure differential creating means comprises an abrupt bend in the conduit.

4. A system as defined in claim 1 wherein the pressure differential creating means comprises a gradual bend in the conduit.

5. A system as defined in claim 1 further comprising a lower sensor means disposed in a side of the conduit for measuring fluid pressure in the conduit, and an upper sensor means disposed in the conduit at an elevation above that of the lower sensor means, for measuring fluid pressure in the conduit.

6. A system as defined in claim 5 wherein said control means includes means for computing the density of fluid flowing in the conduit from the fluid pressure measurements of the lower and upper sensor means, and for computing the flow rate of fluid in the conduit from the fluid density calculation.

7. A system as defined as in claim 1 wherein said control means is a computer system comprising:

a communications bus for communicating signals through the system;

an analog-to-digital convertor for receiving analog signals from the sensor means and converting the analog signals to digital data; and a central processing means for receiving digital data from the analog-to-digital convertor, calculating direction and magnitude of flow, and for producing control signals based on the calculations.

8. A system as defined in claim 1 further comprising a valve means disposed in the conduit for controlling flow of the fluid through the conduit in response to control signals, and wherein said control means includes means for producing control signals for supply to the valve means, to open or close the valve means depending upon the calculation of flow direction and magnitude.

9. A system as defined in claim 8 wherein said valve means comprises a plurality of valves disposed at various locations in the conduit, and responsive to control signals for opening or closing the valves depending upon the calculation of flow direction and magnitude.

10. A system as defined in claim 2 wherein the at least a partially rounded protrusion is spherical.

11. A system as defined in claim 2 wherein the at least a partially rounded protrusion is cylindrical.

12. A system as defined in claim 1 wherein the control means computes the backflow magnitude in accordance with the formula, $$mf = A_1 \sqrt{\frac{2(\Delta P_2 + \Delta P_1)\rho}{((A_1/A_2)^2 - 1)}}$$

where mf is the mass flow, $A_1$ is the cross-sectional area of the conduit at the sensor means disposed upstream, $A_2$ is the cross-sectional area of the conduit at the sensor means disposed at the pressure differential creating means, $\rho$ is the fluid density of the fluid flowing in the conduit, $\Delta P_1$ is the pressure differential detected between the sensor means disposed upstream and the sensor means disposed at the pressure differential creating means, and $\Delta P_2$ is the pressure differential detected between the sensor means disposed upstream and the sensor means disposed downstream.

13. A system as defined in claim 1 wherein the control means computes the flow magnitude in accordance with the formula, $$mf = A_1 \sqrt{\frac{2\Delta P_1 \rho}{((A_1/A_2)^2 - 1)}}$$

where mf is the mass flow, $A_1$ is the cross-sectional area of the conduit at the sensor means disposed upstream, $A_2$ is the cross-sectional area of the conduit at the sensor means disposed at the pressure differential creating means, $\rho$ is the fluid density of the fluid flowing in the conduit, and $\Delta P_1$ is the pressure differential detected between the sensor means disposed upstream and the sensor means disposed at the pressure differential creating means.

14. A system for measuring backflow of fluid normally flowing forwardly in a conduit comprising:

a means incorporated in the conduit for producing a pressure differential in the fluid flowing in the conduit;

a first pressure sensor disposed upstream of the pressure differential producing means for detecting pressure and producing a signal indicating the pressure;

a second pressure sensor disposed at the pressure differential producing means for detecting pressure and producing a signal indicating the pressure;

a third pressure sensor disposed downstream of the pressure differential producing means for detecting pressure and producing a signal indicating the pressure; and a control means responsive to signals from the pressure sensors, for computing backflow magnitude from the pressure differential between the first pressure sensor and the second pressure sensor, and the pressure differential between the first pressure sensor and the third pressure sensor.

15. A system for measuring backflow as defined in claim 14 further comprising:

a fourth pressure sensor disposed in the conduit for detecting pressure and producing a signal indicating the pressure;

a fifth pressure sensor disposed in the conduit at an elevation above the fourth pressure sensor, for detecting pressure and producing a signal indicating the pressure; and wherein the control means includes means responsive to signals from the fourth and fifth pressure sensors, for computing density of the fluid flowing in the conduit, and for computing backflow magnitude from such fluid density computation.

16. A system for measuring backflow as defined in claim 14 wherein said control means comprises:

a communications bus for communicating signals throughout the system;

an analog-to-digital convertor for receiving analog signals from the sensor means and converting the analog signals to digital data; and a computer means for receiving data from the analog-to-digital convertor and processing the data to calculate backflow magnitude.

17. A system as defined in claim 14 wherein the control means computes the backflow magnitude in accordance with the formula, $$mf = A_1 \sqrt{\frac{2(\Delta P_2 + \Delta P_1)\rho}{((A_1/A_2)^2 - 1)}}$$

where mf is the mass flow, $A_1$ is the cross-sectional area of the conduit at the first pressure sensor means, $A_2$ is the cross-sectional area of the conduit at the second pressure sensor means, $\rho$ is the fluid density of the fluid flowing in the conduit, $\Delta P_1$ is the pressure differential detected between the first pressure sensor means and the second sensor means, and $\Delta P_2$ is the pressure differential detected between the first pressure sensor means and the third pressure sensor means.

18. A method for measuring backflow in a conduit, the method comprising the steps of:

positioning a plurality of pressure sensors in the vicinity of a pressure differential producing means incorporated in the conduit, at least one of the pressure sensors being positioned upstream of the pressure differential producing means, at least one of the pressure sensors being positioned at the pressure differential producing means, and at least one of the pressure sensors being positioned downstream of the pressure differential producing means;

conveying data from the plurality of pressure sensors to a microcomputer via a data communications bus; and calculating backflow from the pressure differential between the pressure sensor positioned at the pressure differential producing means and the pressure sensor positioned upstream, and the pressure differential between the pressure sensor positioned upstream and the pressure sensor positioned downstream.

19. A method for measuring backflow in a conduit as defined in claim 18 wherein the method further comprises the step of conveying control signals to one or more valves located in the conduit to thereby control the flow of fluid in the conduit, dependent upon the backflow calculation.

20. A method for measuring backflow in a conduit as defined in claim 18 further including the steps of:

positioning another pressure sensor in the conduit for measuring pressure;

positioning a further pressure sensor in a conduit at an elevation above said another pressure sensor, for measuring pressure; and calculating density of material flowing in the conduit from the pressure measurements of said another pressure sensor and said further pressure sensor, and calculating backflow from the density calculation.

* * * * *